UNITED STATES PATENT OFFICE.

GEORGE F. RIES, OF CHICAGO, ILLINOIS.

COMPOSITION FOR COLORING MEATS AND MEAT PRODUCTS.

1,318,109. Specification of Letters Patent. Patented Oct. 7, 1919.

No Drawing. Application filed March 8, 1919. Serial No. 281,481.

*To all whom it may concern:*

Be it known that I, GEORGE F. RIES, a citizen of the United States, residing at Chicago, in the county of Cook and State of Illinois, have invented certain new and useful Improvements in Compositions for Coloring Meats and Meat Products, of which the following is a specification.

My invention relates to a composition for use in coloring meats and particularly various meat products such as sausage and the like. I am aware that various materials have been used heretofore for this purpose but the results attained have not been the best, and furthermore the product is injurious to the consumer and may in some instances injure the product upon which it is used. The product which I have invented for this purpose is harmless to the consumer and also has no injurious effects upon the product upon which it is used.

Another and further object of the invention is a provision of a composition for coloring meats and meat products which is easily used and which is simple in operation and effective in results.

My invention consists in the combination of orange I, tartrazin and salt mixed together in the form of powder and used as hereinafter described. I find that these materials mixed in the proportion of twenty-three per cent. orange I, two per cent. tartrazin, and seventy-five per cent. salt give the best results, although when combined in other proportions may be used with good results. These ingredients I mix together in the approximate proportions above named and which makes a product in the form of a powder which may be shipped and handled in commercial quantities in any manner desired. The method of using this product is to dissolve the product in water in the proportion of approximately one ounce of the product to three gallons of water and then dipping the meat or meat product in the solution thus formed, removing the meat or meat product from the solution and allowing it to drain, and then smoking the meat or meat product in the usual manner. Under the action of the smoking the meat or the meat product which has been dipped in the solution becomes a dark reddish-brown in color.

While I have described more or less precisely the details of this composition, I do not wish to be understood as limiting myself thereto, as I contemplate changes in the proportion of parts and the substitution of equivalents as circumstances may suggest or render expedient without departing from the spirit or scope of my invention.

I claim:

1. In a composition for coloring meats the combination of orange I; tartrazin, and salt, substantially as described.

2. In a composition for coloring meats, a combination of twenty-three per cent. orange I, two per cent. tartrazin, and seventy-five per cent. salt, substantially as described.

Signed at Chicago, Illinois, this 4th day of March, 1919.

GEORGE F. RIES.